F. B. POTT.
ORE SAMPLER.
APPLICATION FILED MAY 16, 1916.
1,215,988. Patented Feb. 13, 1917.
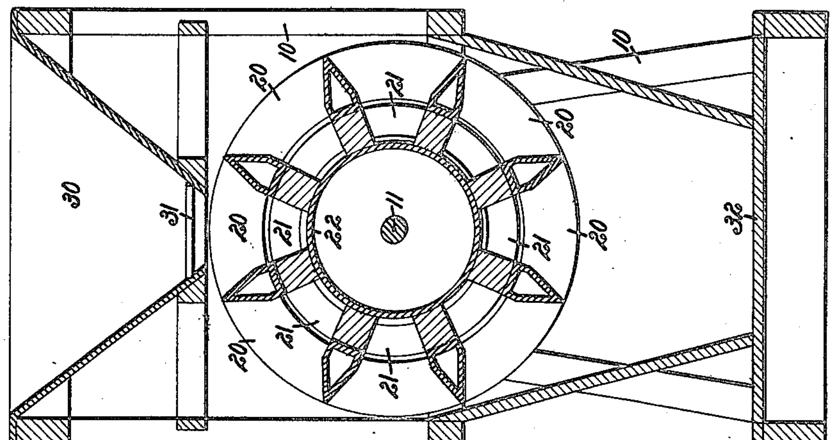
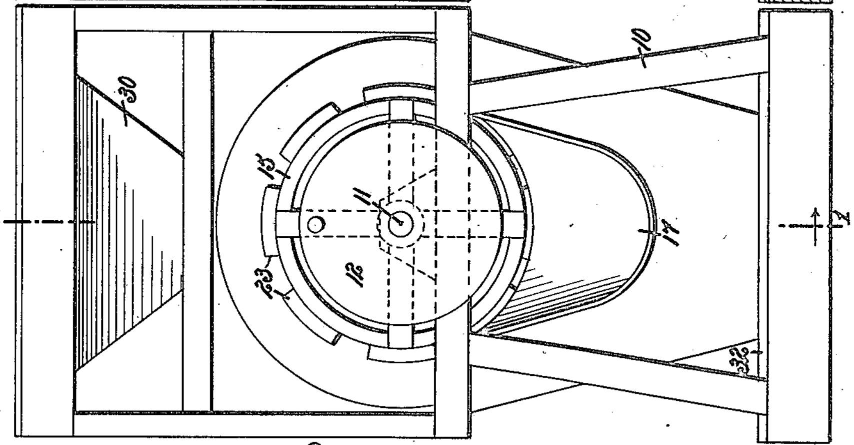
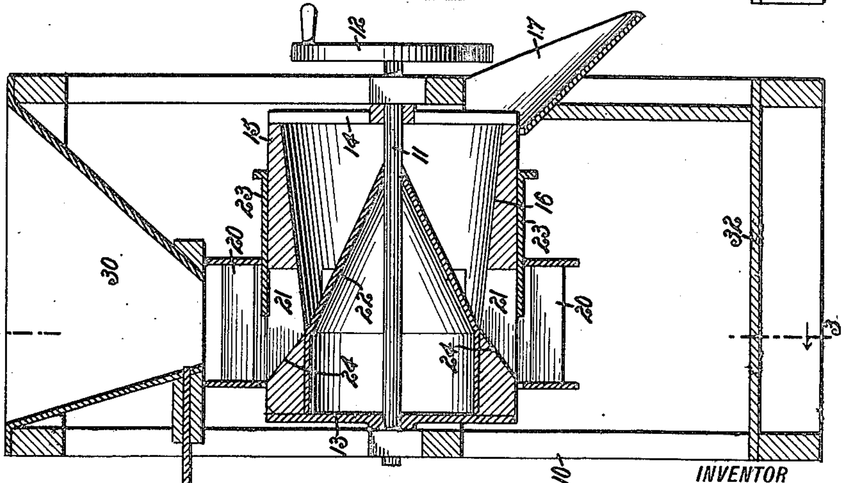
WITNESSES
H. T. Walker
Geo. J. Hoster
INVENTOR
Frank B. Pott
BY Munn & Co
ATTORNEYS

UNITED STATES PATENT OFFICE.

FRANK B. POTT, OF LEADVILLE, COLORADO.

ORE-SAMPLER.

1,215,988. Specification of Letters Patent. Patented Feb. 13, 1917.

Application filed May 16, 1916. Serial No. 97,855.

*To all whom it may concern:*

Be it known that I, FRANK B. POTT, a citizen of the United States, and a resident of Leadville, in the county of Lake and State of Colorado, have invented a new and Improved Ore-Sampler, of which the following is a full, clear, and exact description.

The object of the invention is to provide a new and improved ore sampler which is very simple and durable in construction and arranged to produce an average true sample of the material passed through it.

In order to accomplish the desired result, use is made of a revoluble drum open at one end, a cone arranged centrally within the said drum and rotating with the same, the apex end of the cone leading to the open end of the said drum, buckets arranged peripherally on the said drum and opening onto the base end of the said cone, and means for delivering the material to be sampled into the buckets at the time the latter reach an uppermost position.

A practical embodiment of the invention is represented in the accompanying drawings forming a part of this specification, in which similar characters of reference indicate corresponding parts in all the views.

Figure 1 is a longitudinal central section of the ore sampler on the line 1—1 of Fig. 2;

Fig. 2 is a front end view of the same; and

Fig. 3 is a sectional front elevation of the same on the line 3—3 of Fig. 1.

The ore sampler is mounted on a suitably constructed frame 10 in which is journaled a shaft 11 provided at one end with a hand wheel 12 or other suitable means for rotating the shaft 11. On the shaft 11 are secured spiders 13 and 14 of a drum 15 provided with an inclined inner face 16 leading to a chute 17 fixed at the front end of the frame 10. The drum 15 is provided near its rear end with peripheral buckets 20 registering at their inner ends with openings 21 formed in the drum 15 directly opposite the base end of a cone 22 secured on the shaft 11. The apex end of the cone 22 extends forwardly toward the forward open end of the drum 15, as plainly indicated in Fig. 1. Sliding gates 23 are mounted to slide transversely on the peripheral face of the drum 15 into or out of the buckets 20 to control the amount of material passing from the buckets 20 through the openings 21 onto the base end of the cone 22.

The material to be sampled is placed into a hopper 30 mounted on the upper end of the frame 10 and discharging into the buckets 20 as the latter reach an uppermost position. A gate 31 is slidably mounted on the outlet end of the hopper 30 to control the amount of material passing from the hopper into the buckets 20. The buckets 20 when moving into lowermost position discharge the material therein onto a platform 32 arranged on the base of the frame 10.

The operation is as follows:

When the hopper 30 is filled with the material to be sampled and the shaft 11 with the drum 15 and the cone 22 is rotated then the material passes from the hopper 30 into the buckets 20 as the latter reach an uppermost position. A portion of the material passing into a bucket passes through the opening 21 into the drum 15 at the base end of the cone 22 and this material slides down the cone 22 into the forward end of the drum 15 and down the inclined inner surface thereof into the chute 17 which delivers the material to the front of the ore sampler. It will be understood that some of the material passing through an opening 21 onto the cone 22 will pass off sidewise and out through the other openings 21. The portion of the material remaining in the bucket 20 slides out of the same on the buckets reaching lowermost position and this discarded material drops onto the platform 32 separate from the sample delivered to the front of the machine by the chute 17. It will be noticed that by adjusting the gates 23 more or less material can pass from the buckets 20 into the drum 15 and onto the base end of the cone 22, and more or less material can be fed at a time from the hopper 30 into the buckets 20 by adjusting the gate 31 correspondingly.

From the foregoing it will be noticed that by the arrangement described a very fair and true sample can be obtained from the material to be sampled and it requires, comparatively, but little power to operate the sampler.

It will also be noticed that the ore sampler is very simple and durable in construction and is composed of comparatively few parts not liable easily to get out of order.

Having thus described my invention, I claim as new and desire to secure by Letters Patent:—

1. An ore sampler, comprising a revoluble drum open at one end and mounted on a horizontal axis, a cone arranged centrally within the said drum and rotatable with the same, the apex end of the cone leading to the open end of the said drum, buckets arranged peripherally on the said drum and opening onto the base end of the said cone, and means for delivering the material to be sampled into the buckets at the time the buckets reach an uppermost position, whereby a portion of the material of each bucket will slide down the cone to the open end of the drum and the portion remaining in the bucket discharged therefrom when the bucket reaches its lowermost position.

2. An ore sampler, comprising a revoluble drum open at one end and mounted on a horizontal axis, a cone arranged centrally within the said drum and rotatable with the same, the apex end of the cone leading to the open end of the said drum, buckets arranged peripherally on the said drum and opening onto the base end of the said cone, gates, one for each bucket, to control the amount of the material passing from the buckets onto the cone, and means for delivering the material to be sampled into the buckets at the time the buckets reach an uppermost position.

3. An ore sampler, comprising a revoluble drum open at one end and mounted on a horizontal axis, a cone arranged centrally within the said drum and rotatable with the same, the apex end of the cone leading to the open end of the said drum, buckets arranged peripherally on the said drum and opening onto the base end of the said cone, slidable gates, one for each bucket, to control the amount of the material passing from the buckets onto the base end of the said cone, a fixed outlet chute at the open end of the said drum, and a feed hopper discharging into the buckets on the latter reaching uppermost position.

4. An ore sampler, comprising a revoluble drum mounted on a horizontal axis open at one end and having a tapering inner surface leading to the said open end, the rim of the drum being provided with openings, a cone arranged centrally within the said drum and rotatable with the same, the apex end of the cone leading to the said open end of the drum and the base end of the said cone being opposite the said rim openings, radially disposed buckets arranged on the peripheral face of the drum and leading to the said rim openings, and means for delivering the material to be sampled successively to the said buckets on the latter reaching an uppermost position.

FRANK B. POTT.